UNITED STATES PATENT OFFICE.

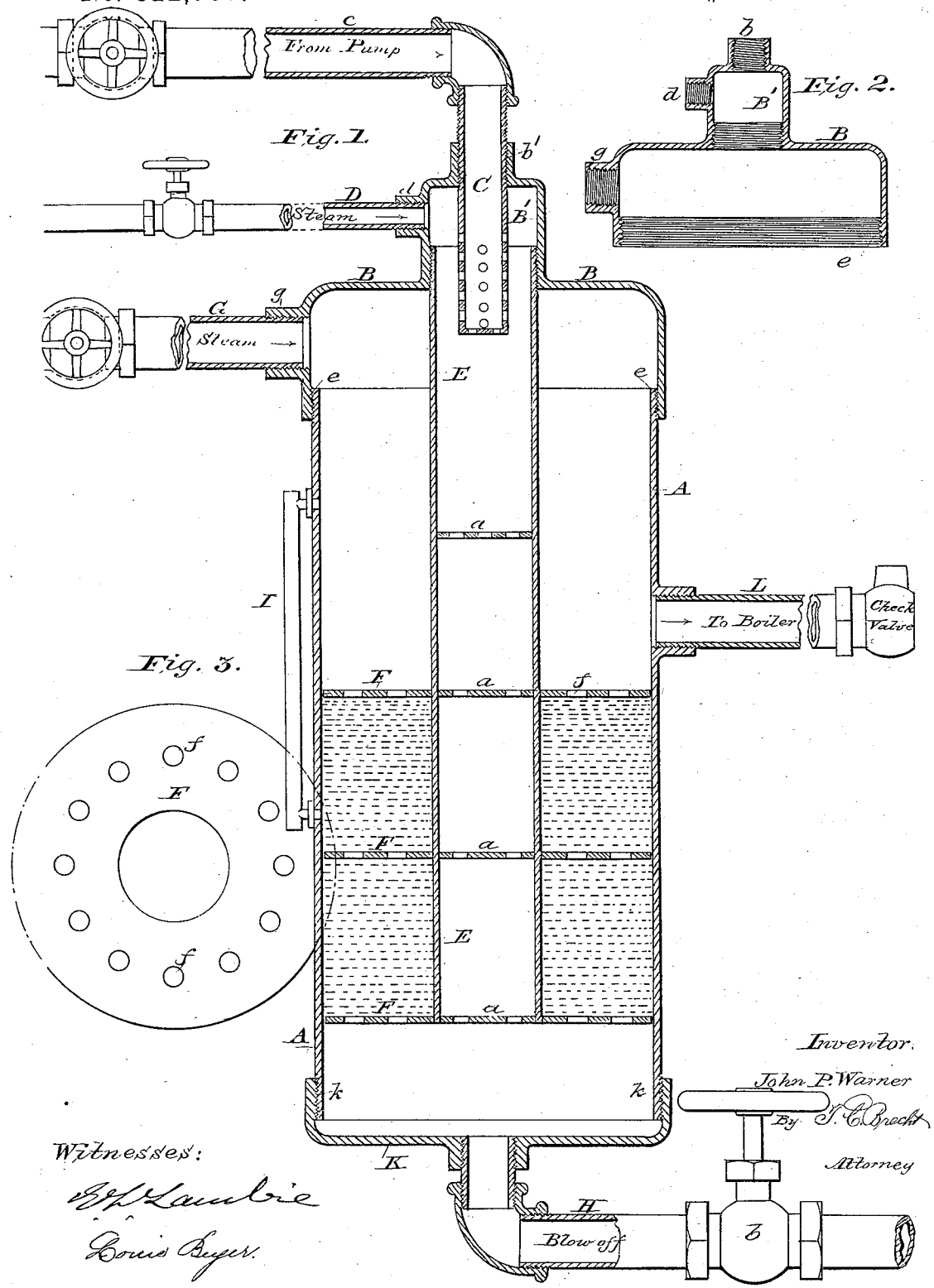

JOHN P. WARNER, OF PHILADELPHIA, PENNSYLVANIA, ASSIGNOR OF FIVE-EIGHTHS TO EDWARD L. LAMBIE, OF WASHINGTON, DISTRICT OF COLUMBIA, AND JOHN F. DEZENDORF, OF NORFOLK, VIRGINIA.

FEED-WATER PURIFIER AND HEATER.

SPECIFICATION forming part of Letters Patent No. 322,767, dated July 21, 1885.

Application filed April 3, 1885. (No model.)

*To all whom it may concern:*

Be it known that I, JOHN P. WARNER, a citizen of the United States, residing at Philadelphia, in the county of Philadelphia and State of Pennsylvania, have invented certain new and useful Improvements in Combined Feed-Water Purifiers and Heaters; and I do hereby declare the following to be a full, clear, and exact description of the invention, such as will enable others skilled in the art to which it appertains to make and use the same.

My invention relates to improvements in combined purifiers and heaters for feed-water for steam-boilers; and the object of the invention is to extract all deleterious matter and impurities from the feed-water which are liable to form sediment or scale in the boilers that necessitates the repeated cleaning or blow-out of the boilers and greatly reduces the generating efficiency thereof, and also to accomplish the purifying and heating of said feed-water in a reliable and thorough manner by a very simple apparatus.

My invention consists of a vessel or chamber connected to the feed-pump or other source of supply at its upper end and having steam-pipes attached to it for heating the feed-water, as well as causing a precipitation of the impurities in said water, and also for cleaning them out by blowing them out at the bottom of the vessel.

It also consists in the construction of certain details and arrangement of parts, as will be more fully described hereinafter, and more specifically pointed out in the claims, reference being had to the accompanying drawings, and the letters of reference marked thereon.

Like letters indicate similar parts in the different figures of the drawings, in which Figure 1 represents a vertical cross-section of my improved apparatus. Fig. 2 is a detached view of the coupling-head of the vessel. Fig. 3 is a plan view of one of the diaphragms.

In the accompanying drawings, A represents a vessel or chamber of suitable dimensions and material according to the size of the boiler, to which it is connected by the steam and feed-water pipes hereinafter referred to. This vessel has a peculiarly-constructed coupling-head, B, which is screwed onto it, and into the upper end, b', of said head is screwed a perforated jet-nozzle, C, connecting with the feed-pump by a pipe, c. At one side of the nozzle C, and at right angles thereto, is attached a small steam-pipe, D, as shown at d, and causes the water entering through the nozzle to pass with great rapidity through a series of screens, a, in an interior pipe, E, toward the bottom of the vessel, and at the same time heats the water. It thus not only relieves the pump of extra pressure, but by creating a vacuum it draws the water more rapidly into the purifier than if merely forced into it by the ordinary devices now employed. This pipe E is screwed into the reduced end B' of the head B, as seen at e, and around this pipe E are arranged a series of diaphragms or screens, F, perforated with one or more rows of holes, f. Between the upper and lower diaphragms is placed a quantity of wire-gauze, although other filtering material may be used. The outlet-pipe for the purified feed-water is connected at one side to the vessel A, and communicates with the boiler. A steam-pipe, G, is screwed into the nozzle g at one side of the head B, and is provided with a suitable valve. When it is desired to clean out the vessel A of the impurities that have accumulated therein, a valve, b, in the pipe H, secured to the bottom K of the vessel, is opened, and said impurities can be blown out into a sewer or other suitable place. The lower head is also screwed onto the vessel, as seen at k. On one side of the vessel A is attached a water-gage, I, and I prefer to arrange it in such manner that it will indicate the proper height of the water in the boiler as well as in the purifying-vessel. The purified water will pass through the pipe L into the boiler, to be generated into steam. All the connections with the coupling-head B are screw-threaded, so that the different pipes can be easily attached or detached, and being all cast in one piece, joints, which are always objectionable, are avoided.

The operation is as follows: The proper connections having been made to the pump and boiler, the water will enter through the pipe D, and will become heated, pass through the screens a toward the bottom of the vessel A, and, rising, it passes through the diaphragms F and the wire-gauze or other filtering material between them, and all impurities contained in the water will be deposited among the wire-gauze or the bottom of the vessel A. The water then passes through the pipe L in a perfectly purified state into the boiler. If there is any indication that the wire-gauze or other parts of the vessel have become clogged or choked with impurities, the valves in the steam-pipes G and H are opened, and the steam rushing through will thoroughly clean and blow out all said impurities.

It will be readily seen by those skilled in the art that this apparatus is very simple and compact in its construction, that it is not liable to get out of order, it can be easily applied to old as well as new boilers, it is reliable in its operation and automatic in its action, it is easily accessible in all its parts for repairs or replacement of filtering material, &c., and it can be produced at a very small cost.

Having thus described my invention, what I claim, and desire to secure by Letters Patent, is—

1. In a feed-water purifier and heater, a vessel, A, having the coupling-head B, provided with the nozzles $b'$, $d$, and $g$, for the attachment of the steam and water pipes, and the reduced part B′, for attachment of the inner pipe, E, all arranged substantially as shown and set forth.

2. The vessel A, having the coupling-head B, provided with screw-threaded nozzles for attachment of the steam and water pipes, the removable head K, to which the blow-off pipe is connected, in combination with the steam-pipe G, arranged as and for the purpose set forth.

3. The combination of a vessel, A, having the coupling-head B, provided with nozzles and screw-threads, as shown, with the inner pipe, E, perforated diaphragms F, steam-pipe G, and blow-off pipe H, all substantially as and for the purpose specified.

4. The feed-water purifier and heater herein described, consisting of the vessel A, having removable head B, provided with screw-threaded nozzles for attachment of the steam and water pipes and the jet-nozzle C, in combination with the inner-pipe, E, the perforated screens or diaphragms $a$ and F, the filtering material, the steam-pipes D and G, and the removable head K, having blow-pipe H connected to it, and all constructed and arranged substantially as specified.

5. In a feed-water heater, the coupling-head B, having the screw-threaded nozzles $b'$ $d$ $g$, reduced part B′, for attachment of the pipe E, and having a screw-thread, $e$, for attaching the head to a vessel, A, all arranged substantially as set forth.

In testimony whereof I hereby affix my signature in presence of two witnesses.

JOHN P. WARNER.

Witnesses:
 E. L. LAMBIE,
 LOUIS BEYER.